United States Patent [19]
Garcia et al.

[11] Patent Number: 4,795,230
[45] Date of Patent: Jan. 3, 1989

[54] DEVICE AND PROCESS FOR SPREADING OPTICAL FIBERS EMERGING FROM A CABLE TO BE CONNECTED

[75] Inventors: Marcel Garcia; Didier Suillerot, both of Paris, France

[73] Assignees: SAT (Societe Anonyme De Telecommunications; SILEC (Societe Industrielle De Liaisons Electriques), both of Paris, France

[21] Appl. No.: 38,005

[22] Filed: Apr. 14, 1987

[30] Foreign Application Priority Data

Apr. 17, 1986 [FR] France .................................. 86 05523

[51] Int. Cl.$^4$ ........................ G02B 6/36; B65H 59/00; B65H 57/28; D01H 1/12
[52] U.S. Cl. .................. 350/96.20; 350/96.10; 350/96.22; 350/96.23; 350/320; 254/134.3 R; 242/128; 242/158 R; 242/158.2; 57/1 R; 57/1 UN; 57/2.3
[58] Field of Search .............. 350/96.10, 96.20, 96.21, 350/96.22, 96.23, 320; 174/70 R; 254/134.3 R, 134.3 CL, 134.6; 242/128, 157 R, 158 R, 158.2, 158.4 R, 158.4 RA; 57/1 R, 1 UN, 2.3

[56] References Cited

U.S. PATENT DOCUMENTS

| | | | |
|---|---|---|---|
| 4,043,854 | 8/1977 | Le Noane et al. | 350/96.22 |
| 4,108,534 | 8/1978 | Le Noane et al. | 350/96.21 |
| 4,153,332 | 5/1979 | Longoni | 350/96.23 |
| 4,154,049 | 5/1979 | King et al. | 350/96.23 X |
| 4,205,899 | 6/1980 | King et al. | 350/96.23 |
| 4,248,035 | 2/1981 | Skillen et al. | 350/96.23 X |
| 4,416,507 | 1/1983 | Hulin et al. | 350/96.22 |
| 4,422,889 | 12/1983 | Trezeguet et al. | 350/96.23 X |
| 4,441,786 | 4/1984 | Hulin et al. | 350/96.21 |
| 4,468,088 | 8/1984 | Van der Hoek | 350/96.23 |
| 4,522,463 | 6/1985 | Schwenda et al. | 350/96.21 |
| 4,556,282 | 12/1985 | Delebecque | 350/96.21 |
| 4,557,558 | 12/1985 | Bresser | 350/96.23 |
| 4,663,926 | 5/1987 | Girardon et al. | 350/96.23 X |
| 4,697,873 | 10/1987 | Bouvard et al. | 350/96.23 |
| 4,706,449 | 11/1987 | Akre | 350/96.23 |
| 4,721,356 | 1/1988 | Soster et al. | 350/96.20 |

FOREIGN PATENT DOCUMENTS

| | | | |
|---|---|---|---|
| 2519050 | 11/1976 | Fed. Rep. of Germany | 350/96.23 |
| 2577051 | 8/1986 | France | 350/96.23 |
| 61-73914 | 4/1986 | Japan | 350/96.23 |

Primary Examiner—William L. Sikes
Assistant Examiner—Brian M. Healy
Attorney, Agent, or Firm—Laubscher & Laubscher

[57] ABSTRACT

In order to spread optical fibers emerging from an end of cable and to firmly attach the cable end with ends of protective jackets in which the spread fibers are strung, the following steps are performed by means a spreading device including mainly a grooved hollow distributor. The distributor is fastened to a sawn off end of a grooved elongated ring in the cable by pinching a central armature emerging from the cable, by jaws housed in the distributor. A split ring is strung around a grooved revolution portion of the distributor. For each fiber, a longitudinal slot of the split ring and a respective groove of the revolution portion are superposed, the end of the jacket of the fiber is entered into the groove through the slot, and the jacket is forced into the groove by partially rotating the split ring so as to superpose the slot and another distributor groove. After entering all the jackets into the grooves, the jackets are jammed in the grooves by clamping the split ring around the distributor portion and narrowing the slot by means of a clamping ring cooperating with an external truncated surface of the split ring. The clamping ring is screwed to a sleeve surrounding the cable end and the distributor. The device is intented to be secured to a wall of an optical fiber connection box.

29 Claims, 6 Drawing Sheets

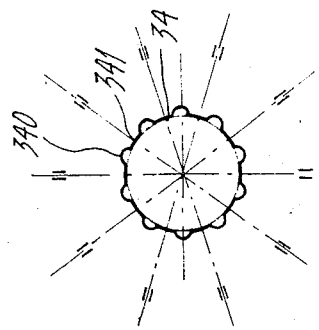
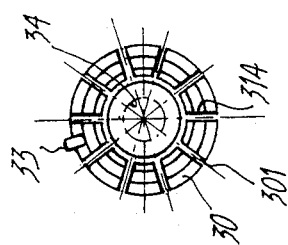
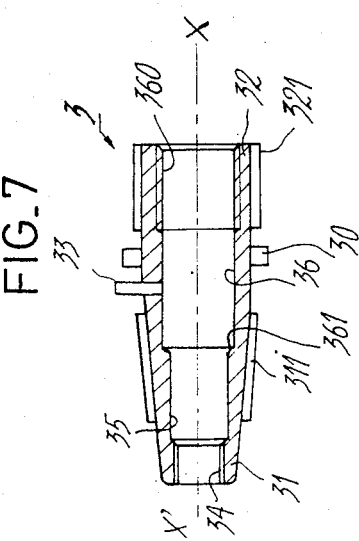
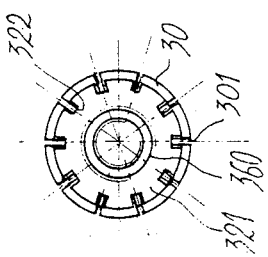
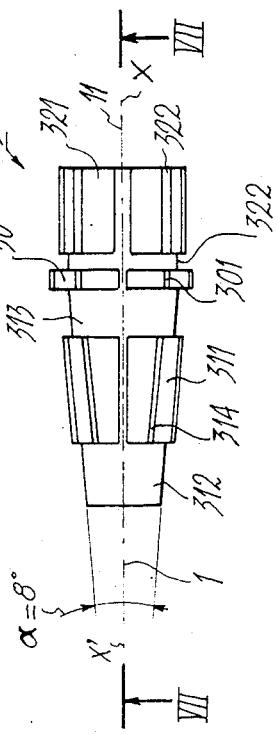

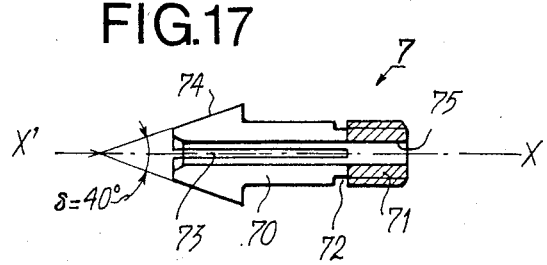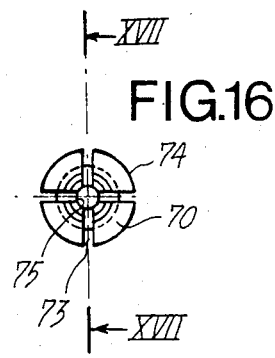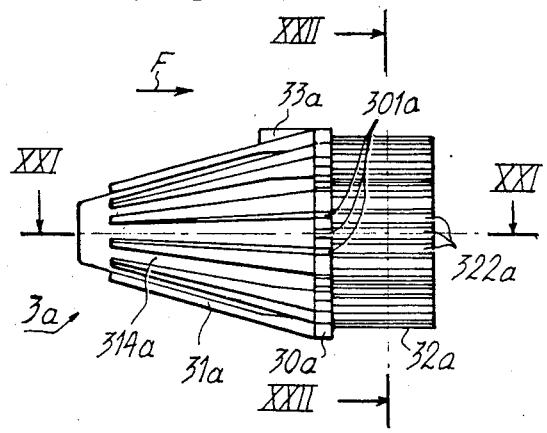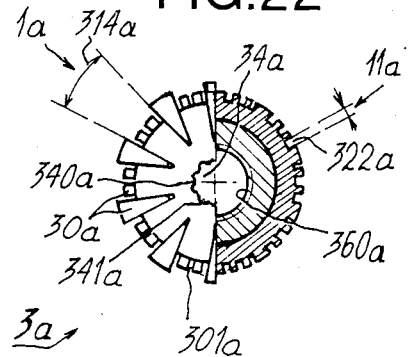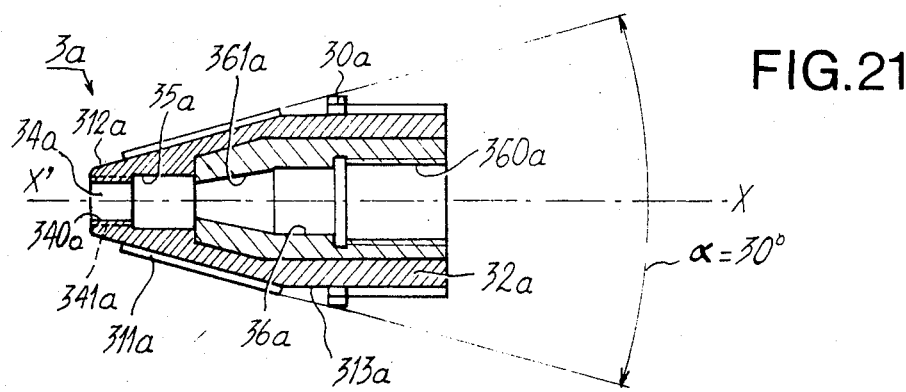

DEVICE AND PROCESS FOR SPREADING OPTICAL FIBERS EMERGING FROM A CABLE TO BE CONNECTED

BACKGROUND OF THE INVENTION

1. Field of the Invention

The present invention relates to a device for spreading optical fibers emerging from a cable thereby releasing ends of the optical fibers from the cable. The released ends of the fibers are then coiled and connected to optical fibers of other cables in an optical fiber connection box. The invention also relates to the operations preceding fiber to fiber connections, and more precisely to the fastening of the stripped end of the cable to the box and to the separation of the fiber ends and a core enclosed in the cable.

2. Description of the Prior Art

In known fiber connection boxes only one rubber grommet is provided to fasten a sheathed cable in an aperture of a box wall. Inside the box, as from the wall, the cable is stripped and the fibers emerge from the cable core, previously sawn, with no special precautions. Nevertheless it has been proved that the fibers emerging as such from the cable can be damaged during the operations of coiling and positioning inside the box in view of inserting their ends into connectors included in the box.

OBJECT OF THE INVENTION

The main object of this invention is to provide a device designed to spread optical fibers emerging from the end of a cable and penetrating respectively into individual protective jackets, and to secure the protective jackets to the end of the cable so that the jackets can not slip on the fibers during subsequent handling.

SUMMARY OF THE INVENTION

In accordance with the above object, a device for spreading optical fibers emerging from an end of an optical fiber cable and freely incoming in the ends of protective jackets respectively, comprises a distributing member, such as a hollow grooved end piece, that is securable coaxially to the cable end and has a revolution portion having first longitudinal external grooves. In each of the first grooves is housed an end of one of the protective jackets containing, with play, the one of the optical fibers and extending beyond the cable. The first grooves have a depth substantially less than the diameter of the protective jacket. The spreading device further comprises a split ring having a longitudinal slot and surrounding the revolution portion of the distributing member, and means for contracting the split ring by narrowing the slot thereby forcing in and jamming the protective jackets in the first grooves.

According to the invention, in order to spread optical fibers emerging from the cable end and simultaneously secure the ends of the protective jackets to the cable end via the hollow distributing member, proceed as follows:

fasten the hollow member to the cable end, string the split ring around the revolution portion of the hollow member, and for each fiber, superpose the slot of the split ring on a first respective longitudinal groove of the revolution portion, entry an input end of the protective jacket of the fiber into the first respective groove through the slot, force the protective jacket into the first respective groove after partially rotating the split ring so as to superpose the slot on another first groove, and after entrying and forcing the input ends of all the protective jackets into the first grooves respectively, clamp the split ring around the revolution portion of the hollow member by narrowing the slot thereby jamming the protective jackets in the first grooves.

The split ring contains a bore having splines, preferably circular and sawtooth, so that splines penetrate substantially into the protective jackets and retain the jackets against any subsequent traction.

According to another feature of the device, the contracting means comprises a threaded clamping ring having a truncated bore, and a threaded sleeve surrounding and securable to the hollow distributing member. The truncated bore cooperates with an external truncated surface of the split ring. The clamping ring is slipped longitudinally against the split ring, by screwing onto the sleeve, thereby contracting the split ring around the revolution portion of the distributing member and pushing the split ring axially against a stop integrated onto the distributed member.

Moreover, fastening of the distributing member to the cable end can include firstly, stringing an unsheated end of an elongated grooved core that is enclosed in the cable, into a bore of the hollow distributing member having at least one finger meshing with one groove of the cable core, so as to rotatably secure the distributing member and the cable end, secondly, inserting a free end of a central cable armature between at least two jaws housable in the distributing member, and gripping the free end of the armature between the two jaws so as to secure the distributing member and cable together, particularly in longitudinal translation movement.

According to other features of the invention, the distributing member has a second revolution portion, preferably truncated type and converging towards the cable, that is fixable around the cable end and has second longitudinal external grooves. A second groove is respectively in alignment with one or several first grooves, and accomadates one or several optical fibers emerging from the same peripheral groove of the cable core. The threaded sleeve has an end bore strung around the cable end, and another end bore complementarly to the second portion of the distributing member. The sleeve covers the second grooved portion and thus close the second grooves, which prevents any escaping of the fibers and contributes to protect them between their emergence from the cable and their entry into the protective jackets. The sleeve cooperates, by screwing, with the clamping ring to form a union-coupling completely enclosing the hollow distributing member. When screwing the clamping ring around the sleeve, the slippage of the truncated bore of the clamping ring against the truncated surface of the split ring tightens up the slip ring around the distributing member.

BRIEF DESCRIPTION OF THE DRAWING

Further features and advantages of the invention will be apparent from the following particular description of several preferred embodiments of the invention as illustrated in the corresponding accompanying drawings in which:

FIG. 4, 5, 6 and 7 are longitudinal, rear side, and front side views and an axial cross-sectional view taken along line VII—VII in FIG. 4, of a grooved hollow distributor included in the first device, respectively;

FIG. 15 is a detailed section of a rear grooved bore of the distributor in the first device accomodating the ring of the first cable;

FIGS. 16 and 17 are a rear view and an axial cross-sectional view taken along line XVII—XVII of FIG. 16, of a gripping member housed in the distributor end piece for pinching a strengthening central armature of the first cable, respectively;

FIG. 20 and 21 are a longitudinal view and an axial cross-sectional view taken along line XXI—XXI, of a grooved distributor included in the second device, respectively; and FIG. 22 is a front and cross-sectional view taken along narrow F and line XXII—XXII of FIG. 21, showing a distribution of grooves on the circumference of the distributor in the second device.

DESCRIPTION OF THE PREFERRED EMBODIMENTS

Figure 1:
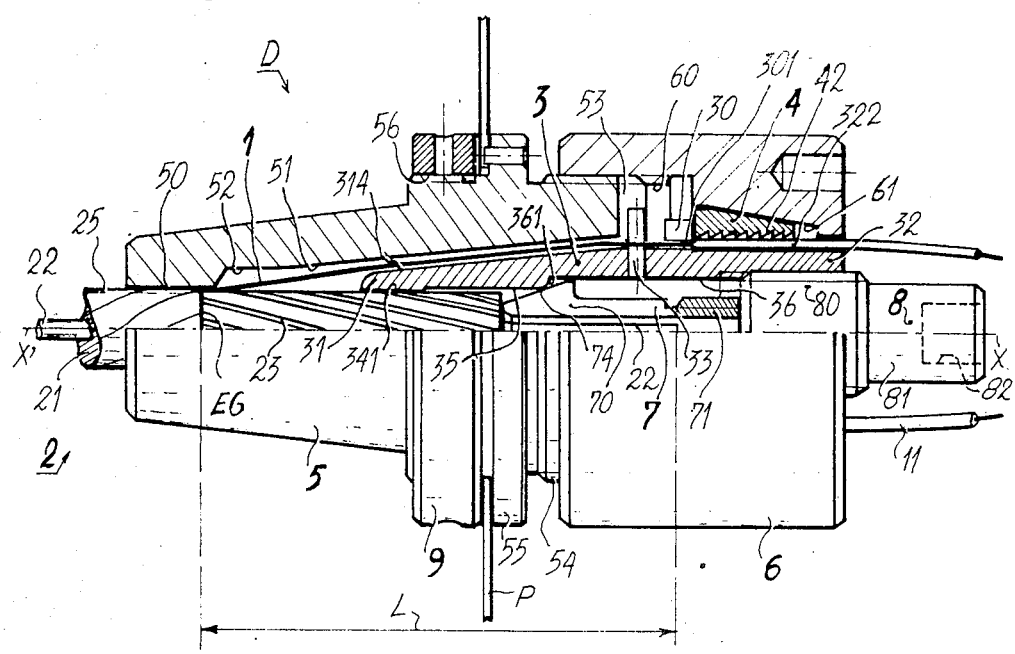
FIG. 1 is a longitudinal view, partially in axial cross-section, of a first optical fiber spreading device fastened to an end of a first optical fiber cable.

According to a first embodiment illustrated in FIG. 1, an optical fiber spreading device D is designed to spread out ends of ten optical fibers 1 that emerge from a cable 2 having a known structure.

Figure 2:
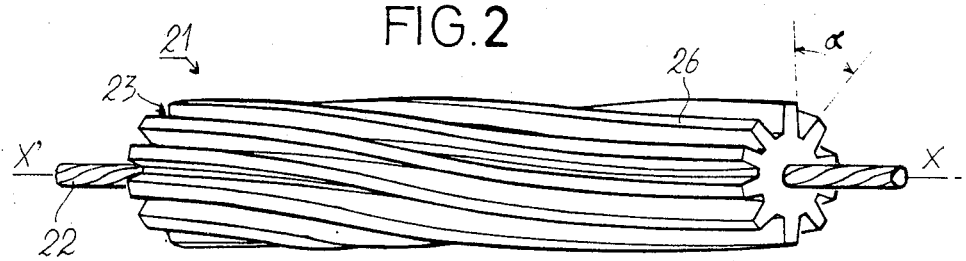
FIG. 2 is a perspective view of a helical groove ring forming the core of the first cable.
Figure 3:
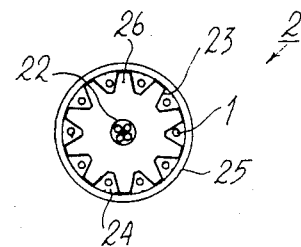
FIG. 3 is a cross-section of the first cable in which each groove of the grooved ring contains an optical fiber.

As shown in FIGS. 2 and 3, cable 2 includes a core in the form of an elongated cylindrical ring 21 made of extruded thermoplastic material. The ring encloses a strenghtening central carrier armature 22, such as a steel wire or strand of several twisted steel wires, or any analogous reinforcement member. Ten parallel helical grooves 23 are equi-spaced on the outer cylindrical surface of the ring 21. According to the first embodiment, each of the grooves 23 contains one single optical fiber 1, preferably sunk in grease 24 to protect the fiber from dampness. Grooves 23 can follow helical layouts sometimes direct, sometimes retrograde. The grooves are trapezoidal or V-shapped, or semi-circular or rectangular in cross-section. The cable also includes an outer sheathing 25 made up one or several jackets wrapped around ring 21, as shown in FIG. 3.

Referring to FIG. 1, the spreading device D comprises a central end adapter, called distributor 3, that can be fastened to a sawn end of the cable ring 21 to spread-out the fibers 1 emerging from cable 2 parallel around longitudinal axis X'X of ring 21, a split ring 4 designed to insert ends of individual flexible protective jackets 11 of fiber around the distributor, each protective jacket containing, with play, one optical fiber 1, a union-coupling 5–6 surrounding distributor 3 and split ring 4 for protecting the spread fibers 1 and for clamping the split ring 3 so as to force in and jam the protective jackets 11 in peripheral grooves of distributor 3, and a gripping member 7 and a clamping screw 8 together partially housed in the distributor for securing the device D to the central armature 22 in cable 2.

The various members included in the device D generally have revolution forms and are arranged coaxially to axis X'X. Most of the aforesaid members are in brass, with the exception of the split ring 4 which is in beryllium bronze.

Distributor 3 is shown in detail in FIGS. 4 to 7.

Seen from the outside, distributor 3 comprises on either side of a circular flange 30, a rear portion 31 in the form of a truncated cone, converging on the opposite side of the flange, in the direction of cable 2, and a front cylindrical portion 32. The rear truncated portion 31 includes an intermediate projecting truncating part 311 having a peripheral surface parallel to portion 31 and sharing the latter into a rear smooth truncated clearance surface 312 located on the side of the cable and a front smooth truncated clearance surface 313 coupled to the flange 30. The front cylindrical portion 32 also includes a projecting part 321 that is cylindrical, and a smooth clearance surface 322 that is cylindrical, and coupled to the flange 312. In the projecting part 311, flange 312 and projecting part 322 are provided ten composite peripheral grooves 314—301—322, equally distributed around axis X'X. Each composite groove consists of a first groove 314 in the projecting part 311, a second groove 301 in flange 30 and a third groove 322 in projecting part 321.

The three grooves 314, 301 and 322 making up the same composite groove are arranged in an axial longitudinal plane of the distributor 3. The cross-sections of the grooves are rectangular or can be the same type as those of grooves 23 of cable ring 21. Grooves 314 and 301 are apt to accommodate one single optical fiber 1 emerging from cable 2, and have a substantially greater width, typically 0.7 mm, and a distinctly greater depth than the diameter of a fiber that is typically 0.125 mm. Moreover, the generatrixes followed by the bottoms of the two grooves 314 and 301 preferably run together above smooth surface 313 so that optical fiber 1 guided in these grooves follows a regular path and is entirely carried in these grooves. Groove 322 is aligned longitudinally with groove 301, but offers a bottom set back substantially from that of groove 301 and a greater width, typically 1.4 mm, so as to accommodate, substantially forced in, an input end of a protective jacket 11 in which the fiber is freely guided. The depth of the grooves 301, typically 1.25 mm, is substantially less than the outside diameter of the jackets 11, typically 1.45 mm.

The union-coupling 5-6, consists as male member, of a sleeve 5 designed to protect and hold the optical fibers 1 in the grooves 311 of the truncated portion 31 of the distributor and, as female member, of a clamping ring 6 designed to clamp split ring 4 around the truncated portion 32 of the distributor so as to force in and jam the ends of sheaths 11 in grooves 322.

Figure 9:
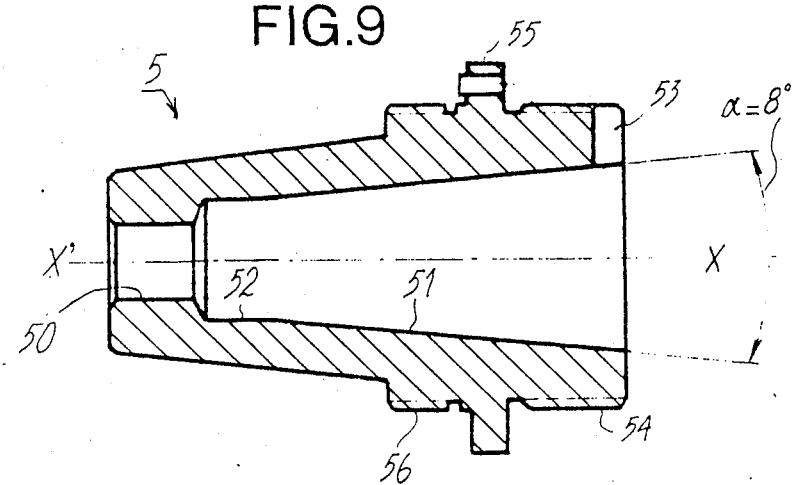
FIGS. 8 and 9 are a longitudinal view and an axial cross-sectional view taken along line IX—IX in FIG. 8, of a unioncoupling sleeve included in the first device, respectively.
Figure 8:
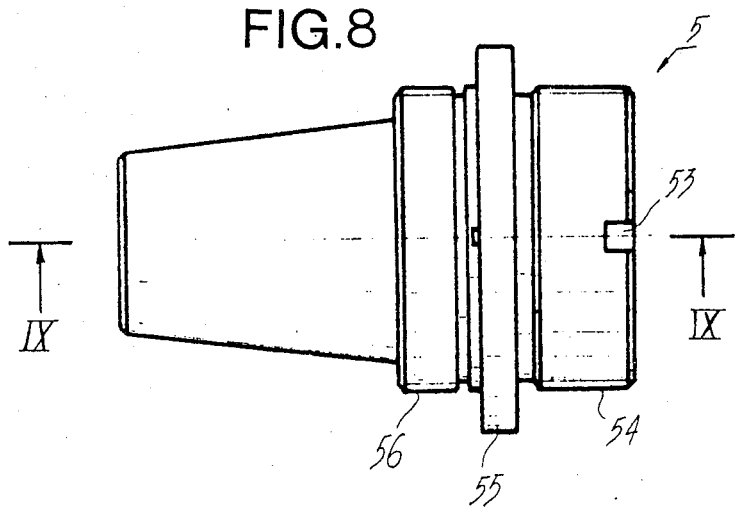

As shown in FIGS. 8 and 9, sleeve 5 has at the rear, on the side of cable 2, a cylindrical bore 50 whose diameter is substantially equal to the outside diameter of the sheathed cable 2, and over the major part of its length, a truncated bore 51 converging to bore 50 via an intermediate cylindrical clearance bore 52 which is short and has a diameter greater than that of bore 50. The truncated bore 51 has an apex angle $\alpha$ of 8° typically, equal to that of the truncated portion 31 of distributor 3 so that bore 51 is fittable around portion 31 and comes in contact with the peripheral surface of the projecting part 311 so as to close grooves 314 containing the optical fibers 1, as shown in FIG. 1. In this position, a radial groove 53 made in the front side of sleeve 5, opposite the cable, houses a pin 33 force fitted radially in distributor 3, on the clearance surface 313 and between two composite grooves 314-301-322, so as to rotating axially secure sleeve 5 and distributor 3 together and to screw clamping ring 6 on the sleeve. Between a flange 55 and the front side of sleeve 5 is provided a front thread 54 around which a rear tapping 60 of clamping ring 5 is screwed. Close to flange 55 and on the cable side, the sleeve is provided with a rear thread 56 for a nut 9 thereby fastening the spreading device D to a plate P, as will be seen below.

Figure 10:
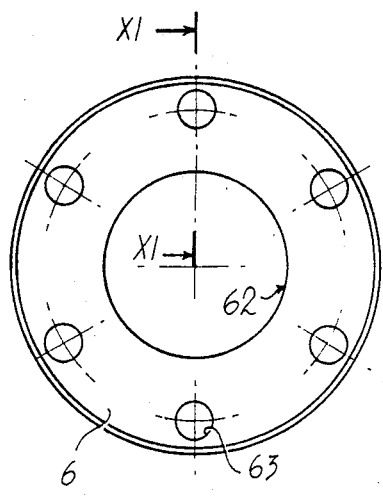
FIGS. 10 and 11 are a front view and a longitudinal view that is partially in axial cross-section taken along line XI—XI in FIG. 10, of a union-coupling clamping ring included in the first device, respectively.
Figure 11:
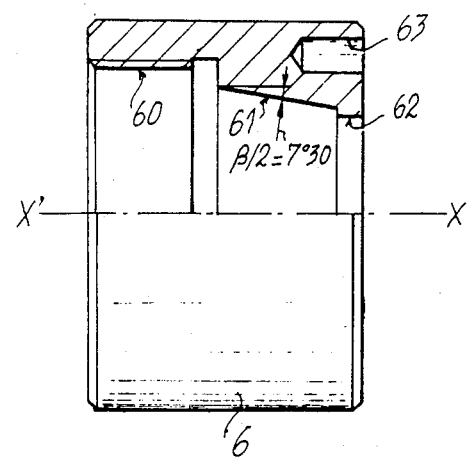

As shown in FIGS. 10 and 11, the clamping ring 6 has, apart from the rear tapping 60, a front truncated bore 61 converging towards the front and emerging towards the outside through a short cylindrical bore 62. As shown in FIG. 1, tapping 60 has a diameter considerably greater than that of flange 30 of the distributor and that taken at the apex of pin 33 so as to enclose them when ring 5 is coupling to sleeve 5. The large base of truncated bore 61 has a diameter substantially greater than that of flange 30, whereas the short base of truncated bore 61 has a diameter greater than that of the front cylindrical projecting part 321 of the distributor thereby inserting split ring 4 between the truncated bore 61 and the projecting part 321. The diameter of the front cylindrical bore 62 is substantially greater than that of part 321 so as to be fitted to it with play. In the front side of clamping ring 6, opposite the sleeve, six longitudinal blind holes 63 are provided to house pegs of a wrench that is used for screwing the clamping ring around front thread 54 of the sleeve.

Figure 12:
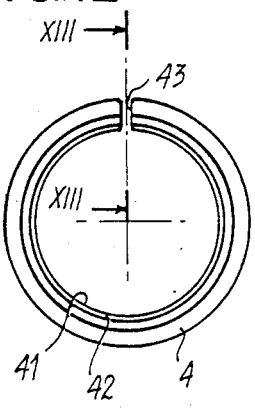
FIGS. 12 and 13 are a front view and a longitudinal view that is partially in axial cross-section taken along line XIII—XIII of FIG. 12, of a split ring included in the first device for locking fiber protection jackets emerging from the distributor, respectively.
Figure 13:
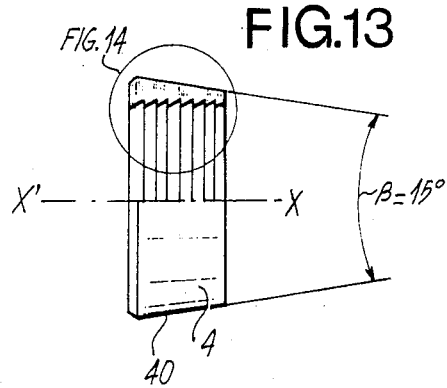

The split ring 4 is shown in FIGS. 12 and 13. Ring 4 has an external truncated surface 40 designed to cooperate with bore 61 of clamping ring 6. Truncated surface 40 has typically an apex angle $\beta$ of 15°. The diameters of the large basis of surface 40 and bore 61 are equal, and split ring 4 is shorter than bore 61.

Figure 14:
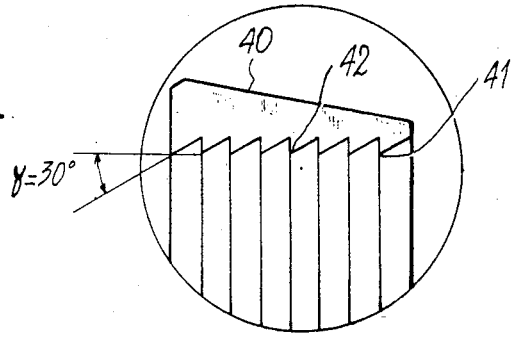
FIG. 14 is a detailed cross-sectional view showing splines inside the split ring shown in FIGS. 12 to 13.

As shown in detail in FIG. 14, split ring 4 has a cylindrical bore 41 with circular, sawtooth splines 62. The inside diameter of bore 41 taken at the apex of splines 42, forming typically sharp internal angles of $\gamma = 30°$ with axis X'X, is equal to the outside diameter of the front projecting part 321 of distributor 3 so that the apexes of the splines push and press the protective jackets 11 in grooves 322 and lock them in position in the latter to prevent any involuntary withdrawal of protective jackets 11 from grooves 322 when handling the jackets. This handling is notably necessary when coiling the jacketed fibers 11 and connecting fibers 1 to those of other optical fiber cables.

Split ring 4 is also provided with a longitudinal slot 43 whose width is substantially less than the diameter of one jacket 11 thereby inserting the fiber jackets 11 one after another in the respective grooves 322, superposing successively slot 43 above grooves 322 through small axial rotations of split ring 4, here through rotations of 360°/10=36°. As will be seen later, after entering all the jackets 11 in grooves 322, the split ring 4 is pushed by the truncated bore 61 of clamping ring 6 against flange 30 of distributor 3 when screwing ring 6 on thread 54 of sleeve 5, and the apexes of splines 42 substantially flute jackets 11 so as to lock them in position in the grooves 322.

As shown cross sectionally in FIG. 7, distributor 3 contains as from its rear end, on the side of cable 2, a grooved cylindrical bore 34 that is short with respect to the pitch of the helical grooves 23 of cable ring 21, an intermediate clearance cylindrical bore 35 having a diameter substantially greater than that of bore 34, and a third cylindrical bore 36 having a tapped front end portion 360. The diameter of bore 36 is greater than that of intermediate bore 35 and with it forms an internal circular shoulder 361.

According to the embodiment illustrated in detail in FIG. 15, the rear bore 34 of the distributor contains longitudinal grooves 340, or preferably helical grooves analogous to the cable ring grooves 23. Bore 34 has a transverse section substantially complementary to that of cable ring 21 so that ribs 26 formed between the peripheral grooves 23 at the end of cable ring 21 mesh into the grooves 340 and thus rotatably secure the cable ring 21 and distributor 3 together. As shown in FIG. 1, a sawn off end of cable ring 21, from which an end of central armature 22 emerges, is slipped into bore 34 upto about half the length of bore 35. According to other embodiments, bore 35 may only contain one rib or finger 341, like the one formed between two adjacent grooves 340 and shown in FIG. 15, for engaging into one groove 23 of the cable ring, or else two or several ribs or fingers that are distributed equally and circularly like corresponding grooves 23 of the cable ring.

The long bore 36 of the distributor is designed to house the gripping member 7 and the clamping screw 8.

Referring to FIGS. 16 and 17, gripping member 7 contains a rear set of four identical longitudinal jaws 70, and a front cylindrical buffer plug 71. Jaws 70 are equally spaced around axis X'X, and have substantially quarter-circle cross-sections. Jaws 70 and plug 71 can be delimited from each other by a circular groove 72, thereby easing radial deflection of the jaws towards the longitudinal axis X'X. The jaws are separated by longitudinal slots 73, typical width 1 mm, extending as far as groove 72. The set of jaws 70 has a rear truncated end 74, with typically an apex angle $\delta = 40°$, converging towards a sawn off side of cable ring 21, as shown in FIG. 1. The large base of jaw set end 74 has a diameter less than that of bore 36, but greater than that of intermediate bore 35 so that the truncated surface of end 74 can be pushed against shoulder 361 inside the distributor and, therefore, end 74 can grip armature 22. The small base of end 74, preferably chamfered inside, has a diameter less than that of bore 35 and lying between the diameters of armature 22 and cable ring 21. The rest of the set of jaws 70 and plug 71 form a cylinder having a diameter less than that of bore 36. A cylindrical conduit 75 crosses axially through gripping member 7 so that a cut-off end of armature 22 and cleared from cable ring 21 can slip in conduit 75.

As shown in FIG. 1, clamping screw 8 is a grub screw having a rear threaded cylindrical portion 80, and a front cylindrical gripping-portion 81. Portion 80 is screwed into the tapped front end 360 of the distributor, thereby pushing member 7 towards the sawn off ring 21 and, therefore, jaw end 74 against shoulder 361 to bring jaws 70 together and pinch armature 22. Screw 8 is screwed by means of a wrench, adapting to the gripping portion 81, which according to the illustrated embodiment, contains an axial blind hole 82 with hexagonal cross-section.

To obtain the spreading of the fibers 1 emerging from cable 2 according to a cylindrical distribution with a diameter greater than that of the cable ring, here a cylindrical distribution diameter substantially equal to that of the front portion 32 of the distributor, and to lock the ends of the fiber jackets 11 in position so that they are secured to the cable, the following operations are performed, referring to FIG. 1. It should be noted that the spreading device D can be preceded by a known grommet, such as a rubber sleeve, fastening the sheathed cable to an outer wall of a fiber-connector box.

Sleeve 5, if necessary with nut 9, is firstly strung onto cable 2, at the back of one end EG of cable sheathing from which the cable is to be stripped off, by slipping bore 50 on sheathing 25.

Sheathing 25 of cable 2 is removed over a great length of the cable determined depending on the length of the fibers necessary to the operations of coiling and connecting fibers which do not come within the scope of the invention. Fibers 1 are taken out from grooves 23 of the unsheated cable ring 21 from the sheathed end EG of the cable behind which is temporarily located the sleeve 5. A very fine wire (not shown), for example in copper, is twisted around each fiber released so as to string the free end of the wire in a jacket 11 and pull the fiber through the protective jacket 11. For example a protective jacket 11 has outside and inside diameters of 1.45 mm and 0.85 mm to accomodate an optical fiber 1 having an outside cladding diameter of 0.125 mm and a core diameter of 0.050 mm.

Then armature 22 and cable ring 21 are sawn off in front of the sheathed end EG of the cable at a length L thereof that is substantially equal to that of sleeve 5. A trunnion of armature 22 having a length substantially less than that of gripping member 7 is then cleared from the end of cable ring 22, by sawing it.

At this stage, distributor 3 can be fastened to the unsheathed end of cable 2. Distributor 3 is strung on the unsheathed end of cable ring 21, without fibers, forming journal, taking care to move away fibers 1, and adjusting fingers 341 of the rear bore 34 into the grooves 23 of the cable ring. The unsheathed end of cable ring 21 penetrates up to about mid-length of intermediate bore 35 in the distributor. Gripping member 7 is then entered into the distributor, and strung on the free end of the cable armature 22 till jaws 70 abut against the internal shoulder 361 of the distributor, in front of the sawn off endface of the cable ring. Screw 8 is screwed into tapping 360 of the distributor. As soon as the rear side of screw 8 abuts against buffer plug 71 of gripping member 7, distributor 3 secured rotationwise with cable ring 21 is moved substantially forwards, and the internal shoulder 361 of the distributor slides on the truncated end 74 of the jaws which come together towards armature 22. At the end of the screwing of screw 8, shoulder 361 clamps the ends of jaws 70 which pinch armature 22 firmly, and member 7 is held captive between shoulder 361 in front of the sawn off endface of the cable ring on the one hand, and the rear side of the screw 8 on the other hand. At this stage, distributor 3 is anchored to cable 2.

According to another embodiment, the radial thrust and abutting effect of the shoulder 361 of the distributor 3 is replaced by or cooperates with that of a shoulder or a truncated bore made in the swan front endface of the cable ring 21 and receiving the rear truncated ends 74 of the jaws 70.

Portions of fibers 1 emerging directly from the sheathed end EG of the cable, and the input rear end of protective jackets 11 that jacket the fibers and are positioned substantially in front of flange 30 of the distributor, are entered one by one into the composite grooves 314–301–322 of the distributor. For this purpose, split ring 4 is strung slipping gently around cylindrical portion 32 of the distributor until it abuts against flange 30, before bending down any of the fibers 1 and jackets 11 in the distributor grooves. Then for each fiber to be entered, proceed as follows. Slot 43 of split ring 4 is superposed radially on a distributor groove 322 which is substantially longitudinally aligned with the end of the cable ring groove 23 from which an optical fiber 1 to be entered emerges. The rear input end of jacket 11 of the fiber is substantially slipped into slot 43 and applied against the bottom of groove 322; simultaneously the free portion of fiber 1 without jacket 11 is applied to the bottom of grooves 314 and 301 lined up with the aforesaid groove 322. Split ring 4 is then turned, here through 36°, so as to bring slot 43 superposed with an adjacent groove 322 thereby entereing another fiber. When rotating ring 4, the internal splines 42 force jacket 11 into groove 322.

When all the fibers 1 and jackets 11 are spread-out and distributed in the grooves of distributor 3 according to successive entry operations similar to those above, sleeve 5 is slipped onto sheath 25 of the cable until the radial pin 33 of the distributor inserts into the front slot 53 of the sleeve. At this stage, the front of the truncated bore 51 covers the projecting part 311 of the distributor and closes grooves 314 containing the entered fibers 1, and the rear of the truncated bore 51 and intermediate bore 52 of the sleeve with cable ring 21 form an annular chamber through which the fibers emerging from the cable cross freely. Then, clamping ring 6 is connected to sleeve 5, screwing the tapping 60 around the front threading 54 of the sleeve. At the end of this screwing, the truncated bore 61 of clamping ring 6 slips on the outer truncated surface 40 of split ring 4, pushes ring 4 against the distributor flange 30 and narrows slot 43. The narrowing of slot 43 produces a contraction of bore 41 of the split ring around the grooved projecting part 321 of the distributor, a slight penetration of splines 42 into the fiber jackets 11 and a jamming of jackets 11 between splines 42 and grooves 322. Under these conditions, the jackets are firmly secured to device D and can not be withdrawn from it subsequent to possible traction operations when coiling and connecting fibers.

According to the arrangement of the connection box, the spreading device is fastened to a plate P which can be a wall or a partition of the box or a part of a support fastened to the bottom of the box. As shown in FIG. 1, the rear threaded portion 56 of sleeve 5 is strung into a slot of the plate, or has been strung through an opening in the plate taking care to have strung the cable through nut 9 and this opening before the fiber spreading and device assembly operations. Nut 9 is screwed on threading 56 and, with flange 55 of the sleeve, surrounds plate P so as to fasten device D in the box.

According to other embodiments, the spreading device is adapted to spread groups of fibers emerging respectively from grooves of a cable ring.

Figure 18:
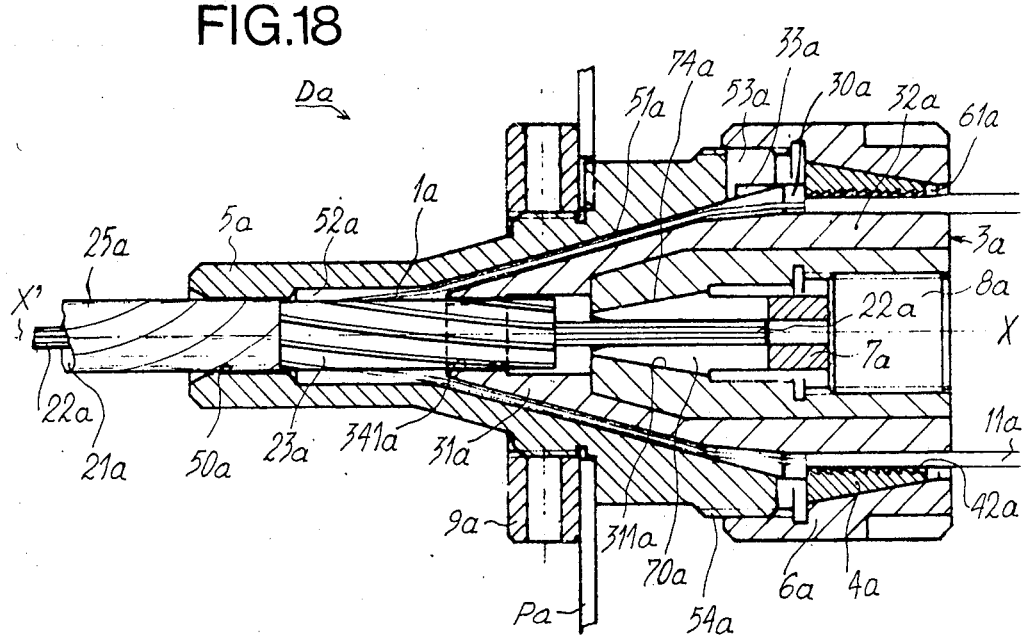
FIG. 18 is an axial cross-sectional view of a second fiber spreading device fastened to an end of a second optical fiber cable.
Figure 19:
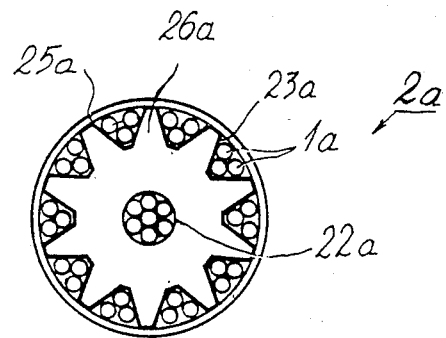
FIG. 19 is a cross-section of the second cable enclosing a grooved ring having grooves each containing three optical fibers.

Depicted in FIG. 18 is a second spreading device Da designed to be fastened to an end of cable 2a including thirty fibers 1a. A ring 21a of cable 2a has ten helical peripheral grooves 23a in each of which a three-fiber 1a group is housed, as shown schematically in FIG. 19. In FIGS. 18 and 19, the different members and portions of members included in device Da are designated with the same reference numbers as similar members and portions in device D shown in FIGS. 1 and 3, with addition of the letter a, respectively. The same applies to FIGS. 20, 21 and 22 showing a distributor 3a according to this second embodiment.

As shown in particular in FIG. 20, the truncated portion 31a of distributor 3a contains ten longitudinal grooves 314a.

Each groove 314a is apt to house three juxtaposed optical fibers 1a of one group, emerging from the same groove 23a of cable ring 21a. Each groove 314a emerges in three grooves 301a made in flange 30a of distributor 3a and accomodating the three respective fibers 1a. Longitudinally aligned with the three previous grooves 301a, three wider grooves 322a are provided in the cylindrical portion 32a of the distributor 3a to house the input ends of the protective jackets 11a of the three aforesaid optical fibers, as shown in FIG. 22.

Moreover, as shown in FIG. 18, the distributor 3a is formed by the assembly of an external, plastic truncated ring and an internal metal ring. The internal ring contains gripping member 7a and thrust screw 8a and comprises a truncated stop shoulder 311a complementary to truncated end 74a of jaws 70a of the gripping member.

What we claim is:

1. A device for spreading optical fibers emerging from an end of an optical fiber cable and freely incoming in the ends of protective jackets respectively, said device comprising
   a distributing member securable coaxially to said cable end and having a revolution portion having first longitudinal external grooves, in each of said first grooves being housed an end of one of said protective jackets containing, with play, the one of said optical fiber and extending beyond said cable, said first grooves having a depth substantially less than the diameter of said protective jackets,
   a split ring having a longitudinal slot and surrounding said revolution portion, and
   means for contracting said split ring by narrowing of said slot thereby forcing in and jamming said ends of said protective jackets in said first grooves.

2. The device claimed in claim 1, wherein said split ring contains a bore having splines for forcing said protective jackets into said first grooves.

3. The device claimed in claim 2, wherein said splines are circular and sawtooth in cross-section.

4. The device claimed in claim 1, wherein said slot of said split ring has a width substantially less than the diameter of said protective jacket.

5. The device claimed in claim 1, wherein said contracting means comprises a threaded clamping ring having a truncated bore, and a threaded sleeve surrounding and securable to said distributing member, said truncated bore of said clamping ring cooperating with an external truncated surface of said split ring, said clamping ring being slipped longitudinally against said split ring, by screwing onto said sleeve, thereby contracting said split ring around said revolution portion of said distributing member and pushing said split ring axially against a stop integrated onto said distributing member.

6. The device claimed in claim 1, wherein said distributing member has a flange having longitudinal grooves aligned respectively with said first grooves and each accomodating the one of said optical fibers, said flange forming an axial stop for said split ring.

7. The device claimed in claim 1, wherein said distributing member has a flange located between said cable end and said revolution portion of said distributing member, said flange having second longitudinal grooves containing respectively portions of said optical fibers emerging from said cable end before entering into said ends of said protective jackets, said second grooves being respectively aligned with said first grooves, and wherein said contracting means comprises a union-coupling including a threaded sleeve and a tapped ring, said threaded sleeve surrounding said end cable and partly said distributing member, said tapped ring having a truncated bore surrounding an external truncated surface of said split ring,
   said tapped ring being screwed onto said threaded sleeve thereby slipping said truncated bore onto said external truncated surface of said split ring, then pushing said split ring against said distributing member flange and contracting said split ring around said revolution portion of said distributing member.

8. A device claimed in claim 1 for which said optical fiber cable enclosed a core in the form of an elongated ring having peripheral grooves containing said optical fibers respectively, said distributing member containing a bore having at least one projecting finger engaging the one of said grooves of said cable ring.

9. The device claimed in claim 8, wherein said distributing member bore and said cable ring have substantially complementary cross-sections.

10. A device claimed in claim 1 for which said optical fiber cable has an elongated central strengthening member, and wherein said device comprises means housed at least partially in said distributing member for securing said distributing member to said strengthening member projecting from said end of said cable.

11. The device claimed in claim 10, wherein said securing means comprises means for gripping one end of said strengthening member projecting from said cable end, and means movable into said distributing member for pushing said gripping means against said cable end whereby said gripping means grips said projecting end of said strengthening member.

12. The device claimed in claim 10, wherein said securing means comprises a gripping member strung around said projecting end of said strengthening member, said gripping member having at least two longitudinal jaws cooperating and abutting with a shoulder inside said distributing member, and a screw screwed into an end of said distributing member for pushing said gripping member against said shoulder, thereby bringing said jaws together and gripping said projecting end of said strengthening member.

13. A device claimed in claim 1 for which said optical fiber cable encloses a grooved core having peripheral grooves containing said optical fibers, and said core encloses an elongated armature, said cable end having a swan endface of said core from which a portion of said armature emerges, said distributing member enclosing means engageable with at least the one of said peripheral grooves of said core for rotatably securing said core in said distributing means, and means lodgeable in front of said core endface and surrounding said armature portion for locking translationwise said distributing member with said cable.

14. The device claimed in claim 13, wherein said locking means comprises means cooperating with an internal shoulder of said distributing member for pinching said armature portion, and means movable into said distributing means for pushing said pinching means against said shoulder, whereby said pinching means grips said armature portion.

15. The device claimed in claim 1, wherein said distributing member has a second revolution portion fixable around said cable end, and having second internal longitudinal grooves, each second groove being aligned with at least the one of said first grooves and housing a portion of at least one of said optical fibers emerging from the one of peripheral grooves of a grooved core in said cable.

16. The device claimed in claim 15 wherein said second revolution portion is truncated and converges towards said cable.

17. A device as claimed in claim 15 comprising a sleeve having an end bore strung around said cable end, and another end bore covering said second portion of said distributing member thereby closing said second grooves housing said fiber portions.

18. The device claimed in claim 17, wherein said sleeve contains a radial slot cooperating with a pin protuding from said distributing member thereby securing said sleeve and said distributing member rotationwise.

19. A device as claimed in claim 17 comprising a clamping ring covering said split ring and screwable onto said sleeve, the screwing of said clamping ring bringing said sleeve and split ring together and against respective stops integrated into said distributing member, said sleeve and clamping ring covering said distributing member.

20. A device as claimed in claim 17 comprising a nut screwed around said sleeve and cooperating with a flange of said sleeve to hold a plate captive.

21. A process designed to spread optical fibers emerging from an end of an optical fiber cable, said process including fastening of a hollow distributing member to said cable end, stringing of a split ring around a revolution portion of said hollow member having first longitudinal external grooves, and for each fiber, superposition of a slot of said split ring on a first respective groove, entry of an input end of a protective jacket of said fiber into the first respective groove through said slot, and forcing of said protective jacket into said first respective groove after partially rotating said split ring to superpose said slot on another first groove, and after entrying and forcing said input ends of all said protective jackets into said first grooves respectively, clamping of said split ring around said revolution portion of said hollow member by narrowing of said slot thereby jamming said protective jackets in said first grooves.

22. A process as claimed in claim 21, wherein, whilst said split ring is being clamped, splines inside said split ring penetrate substantially into said protective jackets.

23. A process as claimed in claim 21, wherein said clamping of said split ring is obtained by slipping of a truncated bore of a clamping ring against an external truncated surface of said split ring, said split ring abutting against a stop protruding on said hollow member against said slipping.

24. A process as claimed in claim 21, wherein said fastening of said hollow member to said cable end includes stringing of an unsheated end of an elongated grooved core that is enclosed in said cable, into a bore of said hollow member having at least one finger meshing with one groove of said cable core, said core having plural peripheral grooves containing said optical fibers.

25. A process as claimed in claim 21, wherein said fastening of said hollow member to said cable end includes an entry of a free end of an armature of said cable between at least two jaws housable in said hollow member and gripping of said free end of said armature between said at least two jaws.

26. A process as claimed in claim 25, wherein said gripping consists in applying a longitudinal thrust of said jaws against a shoulder inside said hollow member thereby bringing said jaws together against said armature.

27. A process as claimed in claim 21 comprising an entry of each of said optical fibers emerging from said cable end, into the one of second longitudinal grooves of said hollow member substantially aligned with at least one of said first grooves housing said protective jackets, simulteanous to said entry of said protective jacket of said fiber into said first respective groove.

28. A process as claimed in claim 27 comprising a closing of said second grooves containing the fibers by means of a sleeve previously strung around said cable before said fastening of said hollow member to said cable end.

29. A process as claimed in claim 28, wherein said clamping of said split ring is obtained by slipping a truncated bore of a clamping ring against an external truncated surface of said split ring, simultaneous to screwing of said clamping ring onto said sleeve until said split ring abuts against a stop protuding on said hollow member and enclosed in said sleeve and clamping ring.

* * * * *